US012681198B2

(12) United States Patent
Heibel et al.

(10) Patent No.: US 12,681,198 B2
(45) Date of Patent: Jul. 14, 2026

(54) NEUTRON RADIATION DETECTOR

(71) Applicant: Westinghouse Electric Company LLC, Cranberry Township, PA (US)

(72) Inventors: Michael D. Heibel, Broomfield, CO (US); Jeffrey L. Arndt, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 354 days.

(21) Appl. No.: 18/467,462

(22) Filed: Sep. 14, 2023

(65) Prior Publication Data

US 2025/0093537 A1     Mar. 20, 2025

(51) Int. Cl.
 *G01T 3/00* (2006.01)
 *G21C 17/00* (2006.01)

(52) U.S. Cl.
 CPC .............. *G01T 3/006* (2013.01); *G21C 17/00* (2013.01)

(58) Field of Classification Search
 None
 See application file for complete search history.

(56) References Cited

U.S. PATENT DOCUMENTS

| | | | |
|---|---|---|---|
| 11,170,903 B2 | 11/2021 | Heibel et al. | |
| 2011/0268237 A1 | 11/2011 | Holden | |
| 2013/0285068 A1* | 10/2013 | Heibel | ...................... G01T 1/24 |
| | | | 257/77 |
| 2017/0115405 A1 | 4/2017 | Biele et al. | |
| 2020/0105426 A1* | 4/2020 | Johnson | ............... G21C 17/108 |

| | | | |
|---|---|---|---|
| 2020/0395137 A1* | 12/2020 | Heibel | ................. G21C 17/041 |
| 2022/0285040 A1 | 9/2022 | Heibel | |
| 2022/0342093 A1 | 10/2022 | Heibel | |
| 2023/0168398 A1 | 6/2023 | Heibel | |

FOREIGN PATENT DOCUMENTS

| | | |
|---|---|---|
| CN | 111335886 B | 4/2023 |
| EP | 3984047 B1 | 8/2023 |
| TW | I802870 B | 5/2023 |

OTHER PUBLICATIONS

Search Report for Taiwan Application No. 113134870, mailed Jun. 27, 2025.
International Search Report and Written Opinion for corresponding International Application No. PCT/US2024/045257 mailed on Oct. 17, 2025.
Singh Ajeet et al: "Properties of the 158 Gd compound state gammadecay cascades", J. Phys. G: Nucl. Part. Phys., vol. 20, No. 12, Jan. 1, 1994, pp. 1943-1953, https://iopscience.iop.org/article/10.1088/0954-3899/20/12/010/pdf.

* cited by examiner

*Primary Examiner* — Hoon K Song
(74) *Attorney, Agent, or Firm* — K&L Gates LLP

(57) ABSTRACT

A neutron flux detector comprising a source material and a solid state radiation detector is disclosed. The source material is configured to produce gamma photons greater than or equal to 6.8 MeV during neutron capture. The solid state radiation detector comprises a Schottky diode and an emitter layer comprising a Compton and photoelectron source material. The emitter layer is configured to receive the gamma photons produced by the source material. The emitter layer is spaced apart from the Schottky diode a distance such that a gap is defined between the emitter layer and the Schottky diode. The distance is selected such that only electrons produced by the emitter layer as a result of the emitter layer absorbing the gamma photons will contribute to a measured output signal of the Schottky diode.

20 Claims, 4 Drawing Sheets

NEUTRON RADIATION DETECTOR

FIELD

The present disclosure is generally related to nuclear power generation and, more particularly, is directed to neutron radiation detection for high temperature nuclear reactors.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a neutron flux detector comprising a source material and a solid state radiation detector is disclosed. In some aspects, the source material is configured to produce gamma photons greater than or equal to 6.8 MeV during neutron capture. In some aspects, the solid state radiation detector comprises a Schottky diode and an emitter layer comprising a Compton and photoelectron source material. In some aspects, the emitter layer is configured to receive the gamma photons produced by the source material. In some aspects, the emitter layer is spaced apart from the Schottky diode a distance such that a gap is defined between the emitter layer and the Schottky diode. In some aspects, the distance is selected such that only electrons produced by the emitter layer as a result of the emitter layer absorbing the gamma photons will contribute to a measured output signal of the Schottky diode. In some aspects, the gap comprises a fluid or a gas positioned intermediate the Schottky diode and the emitter layer. In some aspects, the neutron flux detector is configured for use in a nuclear reactor that is in operation. In some aspects, the measured output signal is directly proportional to an amount of neutron flux due to fission in the nuclear reactor during operation. In some aspects, the neutron flux detector comprises a plurality of the solid state radiation detectors arranged in an array and positioned radially about the source material. In some aspects, the source material comprises a Ni-61 source material. In some aspects, the measured output signal is proportional to a Ni-62 production rate produced by neutron capture of the Ni-61 source material.

In various aspects, a neutron flux detector comprising a Ni-61 source material and a plurality of enhanced gamma sensitivity (EGS) radiation detectors is disclosed. In some aspects, the Ni-61 source material is configured to produce gamma photons during neutron capture. In some aspects, each radiation detector comprises a Schottky diode and an emitter layer comprising a Compton and photoelectron source material. In some aspects, the emitter layer is configured to receive the gamma photons produced by the Ni-61 source material. In some aspects, the emitter layer is spaced apart from the Schottky diode a distance such that a gap is defined between the emitter layer and the Schottky diode. In some aspects, the distance is selected such that only electrons produced by the emitter layer as a result of the emitter layer absorbing the gamma photons will contribute to a measured output signal of the Schottky diode. In some aspects, the gap comprises a fluid or a gas intermediate the Schottky diode and the emitter layer. In some aspects, the neutron flux detector is configured for use in a nuclear reactor that is in operation. In some aspects, the measured output signal is directly proportional to an amount of neutron flux due to fission in the nuclear reactor during operation. In some aspects, the plurality of EGS radiation detectors are arranged in an array and positioned radially about the Ni-61 source material. In some aspects, the gamma photons produced by the Ni-61 source material during neutron capture are greater than or equal to 6.8 MeV. In some aspects, the measured output signal is proportional to a Ni-62 production rate produced from neutron capture by the Ni-61 source material.

In various aspects, a neutron flux detector for use in a fast neutron nuclear reactor is disclosed. In some aspects, the neutron flux detector comprises a source material and an array of enhanced gamma sensitivity (EGS) radiation detectors positioned radially about the source material. In some aspects, the source material is configured to produce gamma photons of a predetermined magnitude during neutron capture when the fast neutron nuclear reactor is in operation. In some aspects, each EGS radiation detector comprises a Schottky diode and an emitter layer comprising a Compton and photoelectron source material. In some aspects, the emitter layer is configured to receive the gamma photons produced by the source material. In some aspects, the emitter layer is spaced apart from the Schottky diode a distance such that a gap is defined between the emitter layer and the Schottky diode. In some aspects, the distance is selected such that only electrons produced by the emitter layer as a result of the emitter layer absorbing gamma photons of the predetermined magnitude will contribute to a measured output signal of the Schottky diode. In some aspects, the gap comprises a fluid or a gas intermediate the Schottky diode and the emitter layer. In some aspects, the measured output signal is directly proportional to an amount of neutron flux due to fission in the fast neutron nuclear reactor during operation. In some aspects, the measured output signal is directly proportional to a current reactor power level in the fast neutron nuclear reactor during operation. In some aspects, the distance between the emitter layer and the Schottky diode is adjustable. In some aspects, the source material comprises a Ni-61 source material. In some aspects, the predetermined magnitude is greater than or equal to 6.8 MeV. In some aspects, the measured output signal is proportional to a Ni-62 production rate produced from neutron capture by the Ni-61 source material.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

DETAILED DESCRIPTION

Figures 1, 2:
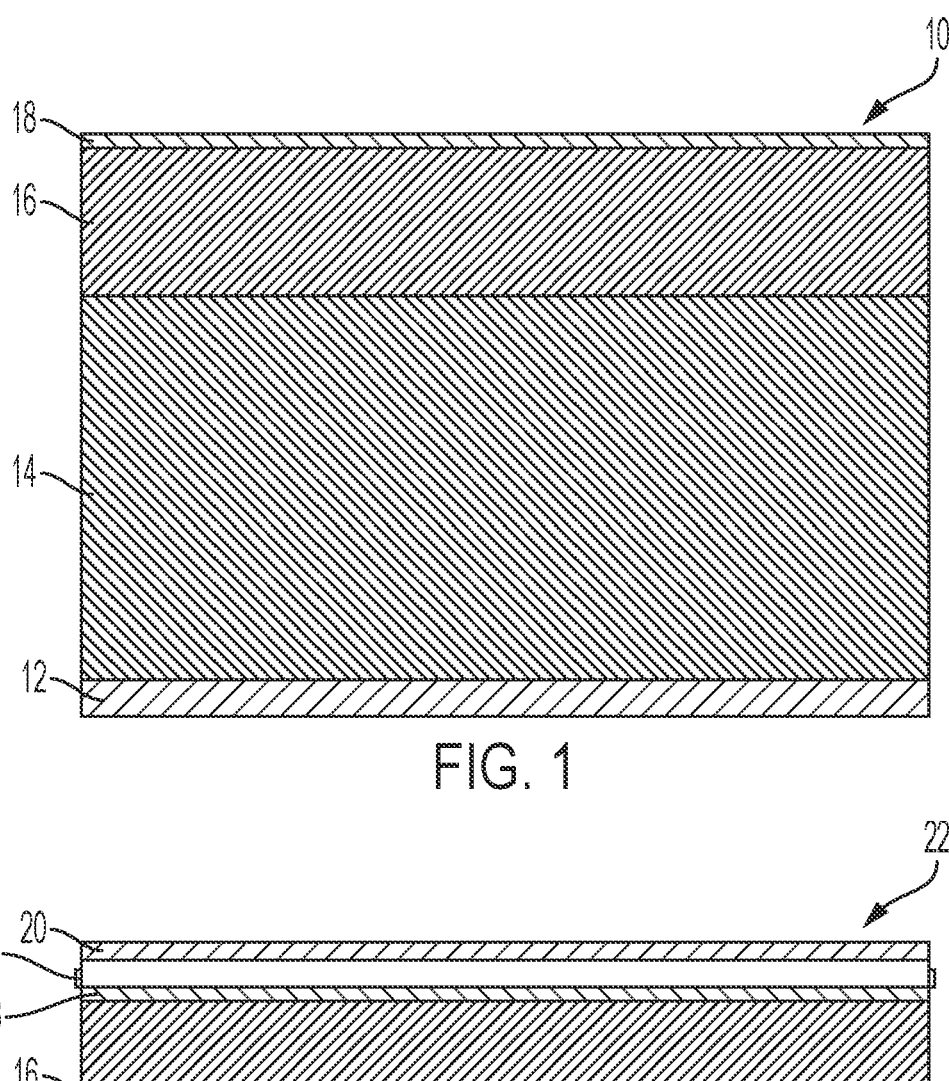
FIG. 1 illustrates a schematic representation of a prior art silicon carbide Schottky diode radiation detector.
FIG. 2 is a schematic representation of a prior art silicon carbide Schottky diode radiation detector with an emitter layer added above the Schottky diode to enhance gamma radiation generated electron deposition in the depleted layer of the detector.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the following description, reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor ("DSP"), programmable logic device ("PLD"), programmable logic array ("PLA"), or field programmable gate array ("FPGA"), state machine circuitry, firmware that stores instructions executed by programmable circuitry, and any combination thereof. The control circuit may, collectively or individually, be embodied as circuitry that forms part of a larger system, for example, an integrated circuit ("IC"), an application-specific integrated circuit ("ASIC"), a system on-chip ("SoC"), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof. Additionally, it shall be appreciated that, as referenced herein, any specific type of control circuit can be effectively interchanged with any of the control circuits described above.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., non-volatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Before explaining various aspects of the neutron detection system in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

Generally, within a nuclear fission reactor, neutron flux is the primary quantity measured to control a nuclear reaction. Thus, regulating and measuring neutron flux within a nuclear reactor is essential for safe and efficient operation of the nuclear reactor. Newer nuclear reactor designs such as Lead Fast Reactors (LFR) and the eVinci reactor design are planned to operate at significantly higher temperatures than previous core designs. The existing standard neutron flux measurement techniques will be difficult, if not impossible, to use at the expected operating temperatures of the LFR and eVinci core designs. Further, existing neutron flux measuring devices and techniques are unable to decipher between radiation produced from fission within the reactor (i.e., the neutron flux) and background radiation within the reactor that is not the direct result of fission. As such, a radiation detector that produces a signal directly proportional to the neutron flux in the reactor during operation that can successfully operate in the LFR and eVinci reactor designs, among other core designs, is needed.

One solution to the above mentioned issues with existing radiation detectors is a neutron flux detector comprising a source material that will produce gamma photons of a predetermined and/or known energy during neutron capture which will then interact with one or more radiation detectors with enhanced gamma-sensitivity design (EGS) to produce a measurable output signal that is directly proportional to the neutron flux in the reactor. The type of source material chosen will determine the energy level of the gamma photons produced during neutron capture. Further, the design and/or structure of the one or more EGS radiation detectors is such that the EGS radiation detectors are capable of deciphering between the gamma photons produced from neutron capture of the selected source material and lower level background gamma radiation that is not produced from fission.

In various aspects, the EGS radiation detectors discussed herein may be of the type described in U.S. patent application Ser. No. 13/769,401 entitled SOLID STATE RADIATION DETECTOR WITH ENHANCED GAMMA RADIATION SENSITIVITY, which issued on Nov. 28, 2018, as U.S. Pat. No. 9,831,375 the entirety of which is hereby incorporated by reference in its entirety. Portions of U.S. patent application Ser. No. 13/769,401 are included herein for convenience.

The use of silicon carbide Schottky diodes as a solid state radiation detector for the measurement of charged particle ionizing radiation has long been known to provide benefits over other types of radiation detectors, particularly in high temperature and high gamma radiation environments. Also, since the silicon carbide detectors are very small, they can be installed or inserted in areas where other detector types would not fit. While current embodiments of silicon carbide detectors will produce a signal proportional to incident gamma radiation, the signal response is very small relative to the response to charged particle impingement onto the active region of the device.

An exemplary prior art Schottky radiation detector 10 is shown schematically in FIG. 1. A back Ohmic contact 12 is formed on one side of a silicon carbide conducting substrate 14. The silicon carbide conducting substrate 14 is approximately 300 microns in thickness and is covered at its opposite end by a layer of epitaxial silicon carbide 16 of approximately from 3 to 100 microns in thickness. The epitaxial silicon carbide layer 16 forms the active region of the detector and is covered at its opposite end by a Schottky contact 18 which can be formed from any highly conductive metal such as platinum or gold. A reverse bias depletes n in the active region 16 and ionizing radiation produces electron-hole pairs in the depleted region. The charge is collected under the influence of an applied voltage across the contacts.

An exemplary prior art enhanced gamma sensitivity radiation detector 22 is illustrated in FIG. 2. Enhanced gamma radiation sensitivity can be achieved over that experienced employing the Schottky diode radiation detector illustrated in FIG. 1, by applying a thin layer of a Compton and photoelectron source material 20 such as platinum, or other suitable high atomic donor material that will, in response to incident gamma radiation, release electrons that will penetrate the active region 14 and contribute to the collection of charged particles in the active region 14. The thin layer of Compton and photoelectron source material 20, such as platinum, is placed above the outer surface of the active region 14 above the Schottky contact 18 as shown in FIG. 2. The distance between the Schottky contact 18 and added source layer 20 is adjustable, and preferably includes a fluid 24 with a low effective atomic number and negligible conductance, such as the properties of air at 1 atmosphere of pressure with a relative humidity less than or equal to 20 percent at 70° F. (21° C.), between the electron donor layer 20 and the Schottky contact 18. The distance between the Schottky contact 18 and the added source layer 20 is adjustable and the material used and the thickness of the source layer 20 is selected based upon the energy range of the gamma radiation that is targeted to be detected by the user. The addition of an adjustable electron donor layer (symbolically represented by a telescoping sleeve surrounding the layer 24), i.e., adjustable in thickness and distance from the Schottky contact 18, allows the gamma radiation to interact with the electrons surrounding the source atoms in the donor material 20 to produce high energy Compton and photoelectrical electrons inside the donor layer 20 that penetrate into the active region 14 of the silicon carbide device. The thickness of the intervening fluid 24 between the platinum layer 20 and the Schottky contact 18 controls the energy of the donor electrons so that they are collected in the active region 14. These features will produce a much higher charged deposition in the active region 14 of detector then is possible without the high energy Compton and photoelectric electrons contributed by the donor layer 20. The charge deposited over a fixed amount of time will be proportional to the energy of the gamma radiation incident upon the layer 20, so both gamma energy and gamma radiation intensity can be determined from the proper analysis of the electrical outputs from the silicon carbide device.

Thus, enhanced gamma sensitivity radiation detector 22 will have all the advantages of the standard silicon carbide radiation detector 10 but will be much more sensitive to user defined spectrum of gamma radiation and energy. This will allow the range of use of this instrument to increase relative to current designs. This device will be more useful in the detection of the radiation that causes the most concern in nuclear power facilities, both during normal operations and post accident conditions. This detector will allow the user to target gamma energy released by specific isotopes of interest or concern. The small sizes possible with these devices make them ideal for applications where a detector must be inserted through a small space into an environmentally or physically hostile environment. This detector design will enhance the ability to perform spent fuel monitoring and other post operating surveillances on spent fuel by allowing the intensity of specific fission product isotope gamma radiation to be measured while the fuel is in the spent fuel pool or other more permanent storage locations. This will allow the determination of the quantities of special nuclear materials contained within the fuel and the surrounding the post accident environment.

Figure 3:
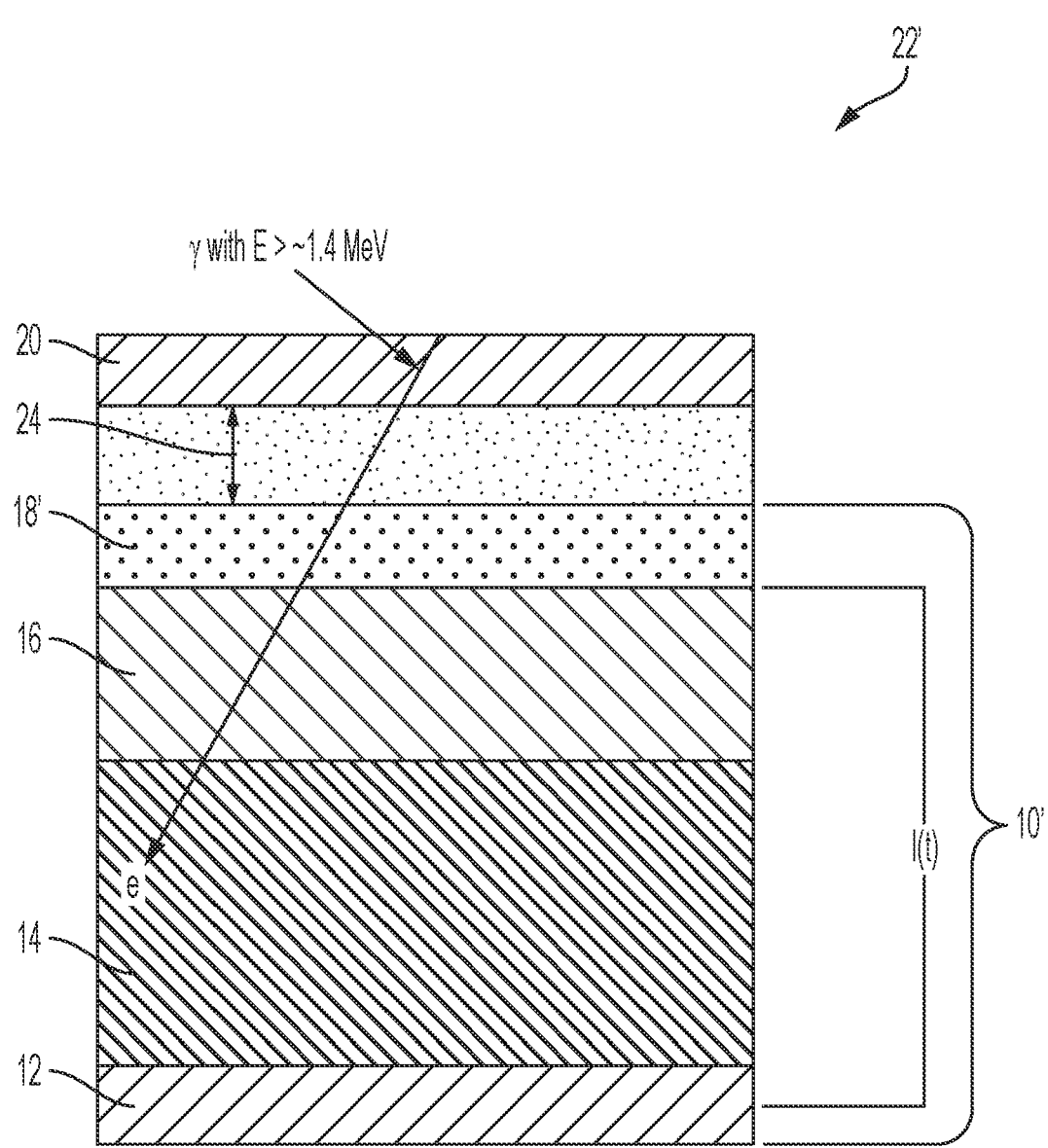
FIG. 3 illustrates a schematic representation of a silicon carbine Schottky diode radiation detector with an emitter layer added above an Schottky diode to enhance gamma radiation generated electron deposition in the depleted layer where the Schottky contact of the Schottky diode comprises aluminum.

FIG. 3 illustrated another EGS solid state radiation detector 22'. The radiation detector 22' is similar to the radiation detector 22 except for the differences noted herein. Specifically, the detector 22' comprises a Schottky contact 18' comprised of aluminum. In at least one aspect, the aluminum Schottky contact 18' may be approximately 1 μm thick. In at least one aspect, the aluminum Schottky contact 18' may be more or less than 1 μm thick. In various aspects, the aluminum Schottky contact 18' can minimize the delta radiation produced by the emitter layer 20. As illustrated in FIG. 3, the radiation detector 22' comprises a Schottky diode 10' spaced apart from the source, or emitter layer 20. The Schottky diode 10' comprises the aluminum Schottky contact 18', the layer of epitaxial silicon carbide 16, the silicon carbide conducting substrate 14, and the back ohmic contact 12. Further, a gap or space 24 is defined between the emitter layer 20 and the Schottky diode 10'. The size of the gap between the Schottky diode 10' and the added source layer 20 is adjustable and the material used and the thickness of the emitter layer 20 is selected based upon the energy range of the gamma radiation that is targeted to be detected by the user. Further, a fluid and/or a gas (e.g., air) positioned within the space 24 can be selected based upon the energy range of the gamma radiation that is targeted to be detected by the user.

Figure 5:
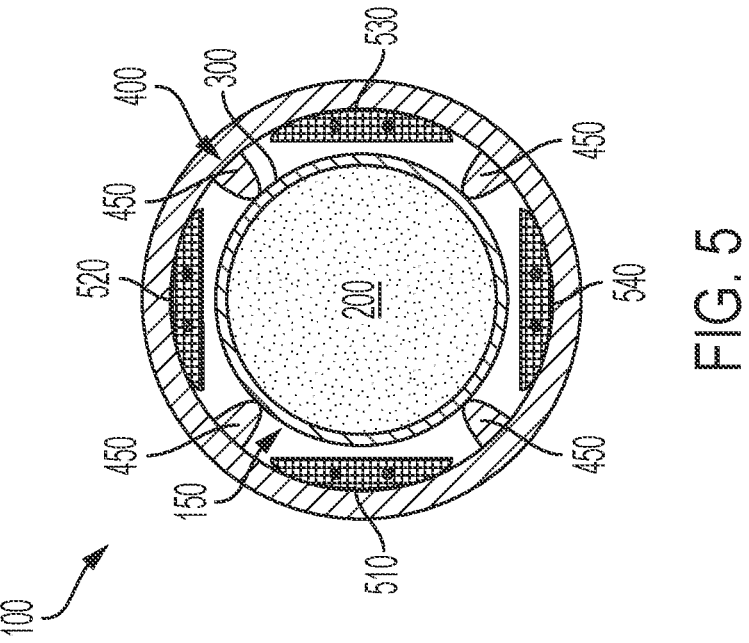
FIG. 5 illustrates a top view of the neutron flux detector of FIG. 4.
Figure 4:
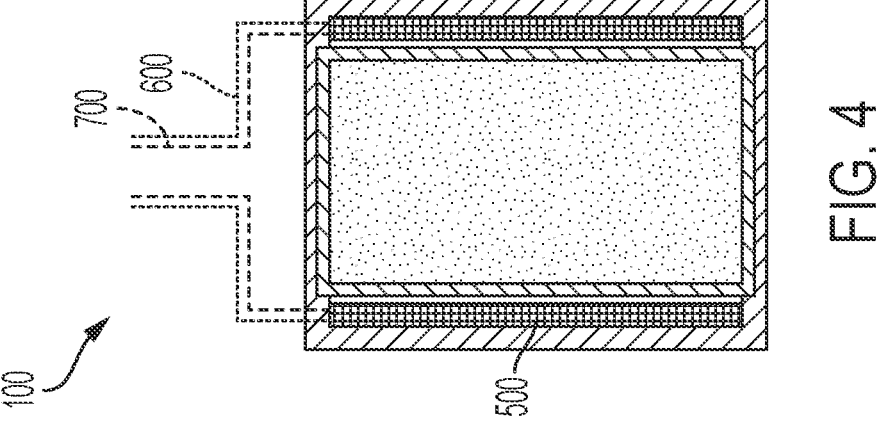
FIG. 4 illustrates a sectioned view of a neutron flux detector including a source material surrounded by one or more enhanced gamma-sensitivity radiation detectors.

Turning now to FIGS. 4 and 5, a neutron flux detector comprising a capsule of source material 200 surrounded by a source material enclosure 300 supported by a capsule support fitting 400 is illustrated. The source material 200 may be any source material capable of producing high energy gamma photons during neutron capture, such as Ni-61, for example. In one aspect, the cross-section of the source material capsule 200 may be cylindrical as illustrated by FIG. 5. In at least one aspect, the source material capsule 200 can comprise a rectangular cross-section, a square cross-section, and/or any other suitable geometric cross section, for example. Further, the capsule support fitting 400 is constructed to surround and support the source material capsule 200 therein. In at least one aspect, the support fitting 400 comprises steel and/or Inconel, for example. Further, in at least one aspect, the capsule support fitting 400 can comprise varying cross-section shapes which correspond to the shape of the source material capsule 200. The capsule support fitting 400 comprises a plurality of support fitting protrusions 450 extending radially inward from the support fitting 400 which support the source material enclosure 300 and, thus, support the source material 200. In at least one aspect, the source material enclosure 300 comprises a ceramic material such as alumina, for example. In various aspects, the material and thickness of the enclosure 300 and the support fitting 400 are selected to support the source material 200 within the reactor without interfering with, or substantially reducing the amount of interference with, the neutrons produced from fission.

Further to the above, the neutron flux detector 100 further comprises an array 500 of enhanced gamma sensitivity (EGS) radiation detectors, such as the radiation detectors 22, 22' discussed above, that are positioned around the source material 200. Within the array 500 is a first array 510, a second array 520, a third array 530, and a fourth array 540. As such, there are four arrays 510, 520, 530, 540 within the array 500 in FIGS. 4 and 5. However, in various aspects, more or less than four arrays may be utilized. In any event, each of the arrays 510, 520, 530, 540 comprises a plurality of radiation detectors 22 and/or a plurality of radiation detectors 22'. In at least one aspect, the detectors 22, 22' are connected in series within each array 510, 520, 530, 540 to amplify the output signal of the detector 100. Further, in at least one aspect, the plurality of detectors 22, 22' are embedded in a plate or plates of material positioned within each array 510, 520, 530, 540.

Referring primarily to FIG. 5, a gap 150 is defined between each of the arrays 510, 520, 530, 540 and the source material enclosure 300. In various aspects, the gap 150 can be adjusted and may, in some instances, affect the output signal of the radiation detectors 22, 22' of the neutron flux detector 100. Specifically, a smaller gap 150 may allow for better transfer of gamma photons produced from Ni-61 during neutron capture to each of the arrays 510, 520, 530, 540 of detectors 22, 22' as compared to a larger gap. In at least one aspect, the gap 150 is sized to filter out lower energy background gamma photons that are not intended to contribute to the measured signal of the detector 100.

Further to the above, the neutron flux detector 100 further comprises a reverse bias voltage supply 700 and a signal output lead 600 leading from the array of radiation detectors 500. The application of sufficient reverse bias voltage from the supply 700 can ensure that the majority of all the delta-radiation electrons, and the ionization electrons produced by the delta-radiation within the active detector volume 14 are captured in the active volume 14 of the SiC detector. Further, the signal output lead 600 can be routed outside the reactor core to signal processing electronics placed in easily accessible areas to allow the use of standard signal processing hardware.

As described above, the EGS radiation detectors 22 and 22' can be modified to adjust the distance between the Schottky contact 18 and the added source layer 20 and/or the material and thickness used for the source layer 20 can be selected and/or adjusted based upon the energy range of the gamma radiation that is targeted to be detected. As discussed in greater detail below, the source material chosen and the adjustments made to the EGS radiation detectors 22 and 22' can be selected such that the measured output signal of the EGS radiation detectors 22 and/or 22' is directly proportional to the neutron flux primarily or solely produced due to fission within a reactor.

Referring again to FIGS. 4 and 5, in at least one aspect of the present disclosure, the source material 200 comprises Nickel 61 (i.e., Ni-61). In such instances, the neutron flux detector 100 is capable of determining neutron flux in a reactor based on the neutron interactions with Ni-61 to produce N-62 from the following reaction:

$$Ni^{61} + n \rightarrow Ni^{62} + \gamma(6.8 \text{ MeV})$$

In other words, when the source material 200 is bombarded with neutrons for fission reactions in the reactor core, Ni-62 and gamma photons in the range of 6.8 MeV are produced. The 6.8 MeV gamma photon is released immediately after neutron capture occurs in Ni-61. The EGS radiation detectors 22 and/or 22' positioned in the array 500 in FIGS. 4 and 5 convert the 6.8 MeV gamma-radiation to high energy electrons by way of the electron emitter layer 20. Further, as described in greater detail herein, the maximum distance a scattered electron with the maximum photoelectric and Compton-scattering energy from a 6.8 MeV gamma interaction can travel through to reach the active region 14 of the detector 22 can be determined through calculations and the emitter layer 20 can be spaced a predetermined distance from the active volume of the SiC depletion region 14 such that only higher energy electrons contribute to the measured signal of the EGS radiation detector 22. In other words, the detectors 22 and/or 22' can be modified such that only higher energy electrons emitted by the emitter layer 20 as a result of neutron interactions from fission with the emitter layer 20 will contribute to the measured signal of the detectors 22, 22'. As such, the measured signal of the detectors 22, 22' will be directly proportional to the neutron flux from fission within the reactor. Further, the Ni-62 decay gamma is the highest energy gamma likely to contribute to the signal. As such, the signal output from EGS detectors will be directly proportional to the Ni-62 production rate. The Ni-62 production rate is directly proportional to the population of fission neutrons with energies above approximately ~0.025 MeV and, thus, the measured output signal will be directly proportional to fission neutron flux, and by extension, the reactor power level. The calculations behind selecting the adjustments to the detectors 22 and 22' are discussed in greater detail below.

Figure 6:
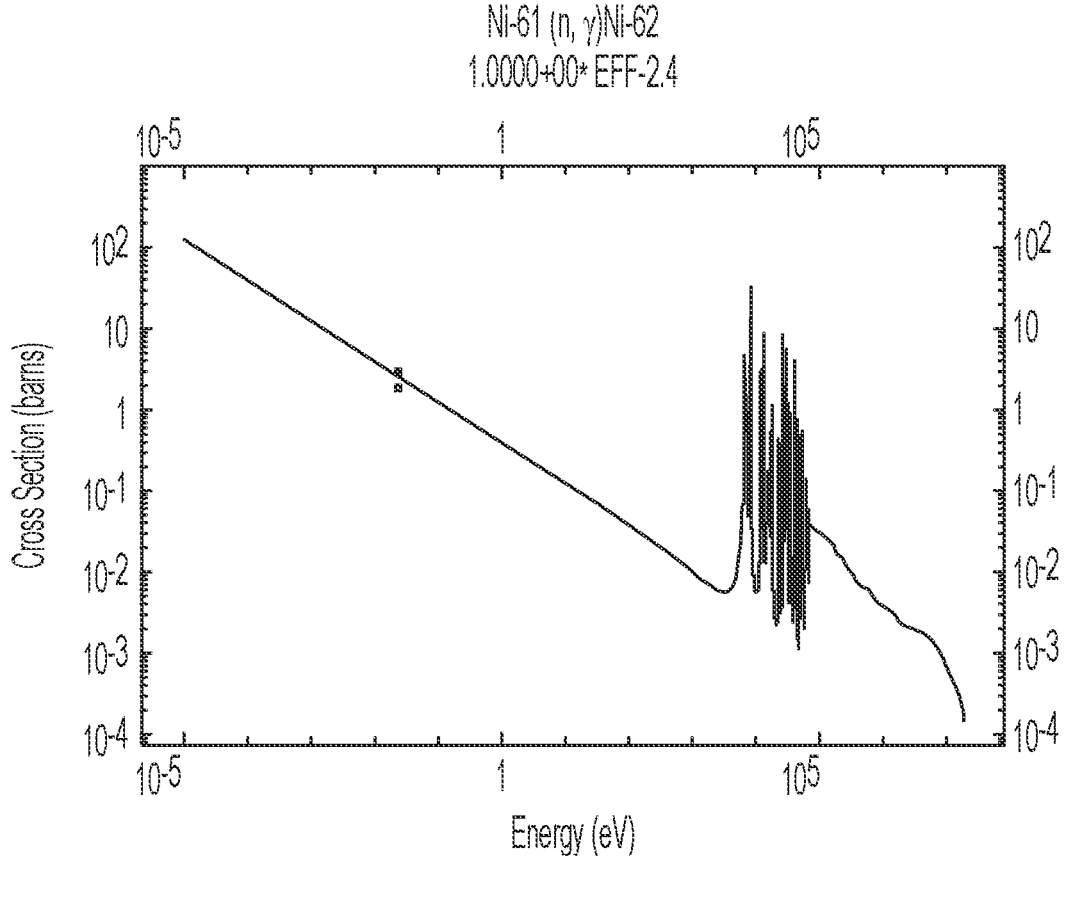
FIG. 6 is a graphical representation of the neutron-capture cross section for $Ni^{61}$ as a function of neutron energy Corresponding reference characters indicate corresponding parts throughout the several views. The exemplifications set out herein illustrate various aspects of the invention, in one form, and such exemplifications are not to be construed as limiting the scope of the invention in any manner.

FIG. 6 provides the neutron-capture cross section for Ni$^{61}$ as a function of neutron energy. The number of Ni$^{62}$ atoms created per cm$^3$ per second, is primarily proportional to the neutron flux between 0.025 and 0.041 MeV. The expected neutron flux at lower neutron energies in a Lead Fast Reactor (LFR) will be much less than the neutron flux in this energy range. As such, the contribution from neutrons at lower energies to the gamma intensity will be insignificant if not undetected. The neutron-capture cross sections at higher neutron energies are very small, so it is conservatively assumed that the contribution to the gamma flux may be ignored. The average neutron energy in that range is 0.032 MeV. In the LFR, the average neutron flux ($\Phi_n$) at that energy is 7.6E13 n/cm$^2$/sec. The average neutron-capture cross section ($\sigma_a^{N61}$) in that energy range is 1.96 b. The neutron flux levels in the LFR in this energy range are provided in Table 1 below.

TABLE 1

| Neutron Flux at n, γ peak cross section LFR Data | |
| --- | --- |
| Energy (eV) | Flux (n/cm$^2$/sec) |
| 4.08677e+04 | 7.94178e+13 |
| 2.47875e+04 | 7.10791e+13 |
| 1.50344e+04 | 5.48520e+13 |
| 9.11881e+03 | 3.39560e+13 |

Further to the above, during neutron capture of Ni 61, each Ni$^{62}$ atom produced generates one high energy gamma photon. The number of the gamma photons produced ($\phi_\gamma$) produced per cm$^3$ per second contained in the irradiated material is given by the expression:

$$\Phi_\gamma = \sum_a^{N61} \Phi_n$$

The value of $\Sigma_a^{N61}$ is determined using the formula:

$$\sum_a^{N61} = \frac{\rho_{N61} N_{AV}}{M_{N61}} \sigma_a^{N61}$$

For pure Ni$^{61}$, the value of $\rho_{N61}$ is 8.9 gm/cm$^3$. The value of the mass ($M_{N61}$) is 60.93 gm/mol. The value of $\sigma_a^{N61}$ is 1.96E-24 cm$^2$. The value of Avogadro's number is 6.023E23 atoms/mol. The value of $\Sigma_a^{N61}$ is therefore 0.172 cm$^{-1}$. Using the corresponding average neutron flux of 7.6E13 n/cm$^2$/sec, the value of $\Phi_\gamma$ becomes 1.31E13 γ/cm$^3$/sec. Using an assumed 1 cm thickness of Al$_2$O$_3$ produces a $^{16}$N gamma flux of 3.4E11 gamma/cm$^2$/sec. The delta-radiation electrons input to the active volume of the SiC detector are produced primarily in the platinum electron radiator material positioned between the Ni$^{61}$ gamma radiation source and the active volume of the SiC device. The intensity of the delta-radiation (D) emitted from the electron radiator per cm$^2$ per second is directly proportional to the activity of the gamma radiation emitted from the irradiation target material. The equilibrium value of D may be expressed as a function of the Ni$^{61}$ gamma radiation activity using the relationship:

$$D = \Phi_\gamma K$$

The value of K is equal to the number of delta-radiation electrons produced in the platinum electron radiator per gamma photon interacting with the platinum material. Further, the book Titled: Nuclear Physics by Author Irving Kaplan, referred to hereafter as Reference 1, discusses a method for calculating the number of electrons produced in the platinum from the Ni$^{61}$ gamma radiation based on the macroscopic interaction cross sections for photoelectric and Compton scattering. The value of K may be determined from this information using the formula:

$$K(E_\gamma) = T(\Sigma_p(E_\gamma) + \Sigma_C(E_\gamma) + \Sigma_{PP}(E_\gamma))$$

Where $\Sigma_p$ is the macroscopic photoelectric cross section of platinum for Ni$^{61}$ gamma radiation at gamma energy $E_\gamma$. $\Sigma_C$ is the macroscopic Compton scattering cross section for Ni$^{61}$ gamma radiation at gamma energy $E_\gamma$. $\Sigma_{PP}$ is the macroscopic Pair-Production scattering cross section for Ni$^{61}$ gamma radiation at gamma energy $E_\gamma$. In at least one aspect, the average Ni$^{61}$ gamma photon energy is 6.8 MeV. The value of T is the thickness of the electron radiator (i.e., the emitter layer 20). Typical average fission spectrum and fission product gamma radiation energy is approximately 2 MeV, so the delta-radiation produced by the fission and fission product gamma radiation will have a much shorter range than the delta-radiation produced by the 6.8 MeV Ni$^{61}$ gamma radiation.

The Pair-Production mechanism produced electron and positron results in low energy gamma radiation, significantly less than the 6.8 MeV gamma radiation produced by Ni$^{61}$ gamma reactions, and the delta-radiation electrons produced from this reaction may arise from many other sources. The neutron flux detector 100 will not include these potentially time-varying sources in the measured signal as they will be discriminated against using the spacing of the emitter layer 20 relative to the active volume 14 of the detector 22, 22'. In various instances, the gap or space between the emitter layer 20 and the Schottky contact 18 of the detectors 22, 22' can be adjusted so that only electrons produced as a result of the emitter layer absorbing the gamma photons will contribute to a measured output signal of the detector 22, 22'.

Sections 15-4 through 15-6 of Reference 1 provide the details on the derivation of the macroscopic gamma-radiation interaction coefficients for photoelectric, Compton, and pair-production. The approaches described in the reference can be used to estimate a value of 0.01 cm$^{-1}$ for photoelectric absorption and 0.12 cm$^{-1}$ for Compton scattering in platinum in the 4-8 MeV gamma energy range. If the platinum target is 0.01 cm thick, the Compton and photoelectric delta-radiation flux caused by the Ni$^{61}$ gamma radiation from an average neutron flux of 1.31E13 n/cm$^2$/sec will be approximately 1.7E10 e$^-$/cm$^2$/sec. The value of the delta-ray energy for photoelectric reactions is approximately equal to the value of the gamma photon energy. In at least one aspect, the value used for this reaction is 6.8 MeV.

The determination of the average delta-radiation energy resulting from Compton reactions with 6.8 MeV gamma photons is given by Equation 15-5 in Reference 1. In at least one aspect, it is assumed that the EGS detector window area (i.e., the gap between the Schottky contact 18 and the emitter layer 20) totals 1 cm$^2$, and only electrons scattered within a +/−30° angle can enter the active volume of the SiC detector, the average energy of the delta radiation electrons will be approximately 4 MeV. The average delta-radiation electron energy is given by the weighted average energy of the Compton and photoelectric cross sections. This results in a total average energy of 4.5 MeV. From Section 14-2 of Reference 1, if graphite is used in the space between the SiC detector window and the platinum emitter source 20, the maximum range of the delta-radiation electrons in graphite is approximately 1 cm.

If the gap between the platinum material is set at 0.5 cm, essentially all of emitter layer 20 produced high-energy delta-radiation electrons will enter or pass through the active volume 14 of the detector 20, 22' and the delta-radiation produced by fission and fission product gamma radiation will be absorbed within the graphite. Application of suffi-cient reverse bias voltage can ensure that the majority of all the delta-radiation electrons, and the ionization electrons produced by the delta-radiation within the active detector volume 14, are captured in the active volume 14 of the SiC detector. This means that the total charge collected within the detector 20, 22' will correspond to the input delta-radiation plus the additional ionization created in the depleted region of the detector by the delta-radiation. Any gamma radiation that enters the active volume 14 of the detector 20, 22' will generate very little signal in the detector relative to the impact of a charged particle. In other words, this signal will be negligible compared to the delta-radiation induced signal. In various aspects, other materials can be used within the neutron flux detector 100 to filter out the non-Ni-61 delta-radiation to allow the size of the devices to be adjusted to fit a specific application geometry. Specifi-cally, materials of high atomic number such as lead or zinc may be placed around or within the detector 100 to further attenuate the undesirable low energy gamma photons from contributing to the measured signal of the radiation detectors 22, 22' of the neutron flux detector 100.

The total charge produced by the delta-radiation in the detector 22, 22' from an average neutron flux of 1.3E13 n/cm$^2$/sec can be conservatively estimated to be 1.7E10 high-energy delta-radiation electrons per cm$^2$ of detector window area per second. This corresponds to producing approximately 2.7 nA per cm$^2$ of SiC detector window. The measured sensitivity of a typical Platinum Self-Powered detector produces a signal of approximately 0.96 nA per cm$^2$ of surface area when exposed to fission spectrum gamma radiation at a thermal neutron flux of approximately 1.3E10 n/cm$^2$/sec. However, for reactors designs with higher oper-ating temperatures the insulation resistance of any SPD-style device will decrease to the point where these devices lose the ability to operate properly. In contrast, the operating char-acteristics of a SiC detector, such as the detectors 22, 22', would remain unchanged at higher operating temperatures.

If multiple tubes are installed in the reactor core in strategic core radial locations, the reactor power level as well as the core axial and radial power distribution may be continuously determined. Since the gamma radiation is emitted promptly upon neutron capture in Ni-61, the output signal could be used in the Reactor Protection System (RPS).

The small capture cross section of Ni-61 indicates that this type of detector could, in principle, last the entire life of the reactor. The small size of the SiC detector design allows the detector assembly to be manufactured using tubes with very small diameters limited only by the amount of Ni-61 needed to generate sufficiently large output signals over the desired detector lifetime. This allows the detector tubes to be positioned inside existing design features of most reactor cores.

Various aspects of the present disclosure include, but are not limited to, the aspects listed in the following numbered clauses.

Clause 1—A neutron flux detector comprising a source material and a solid state radiation detector is disclosed. The source material is configured to produce gamma photons greater than or equal to 6.8 MeV during neutron capture. The solid state radiation detector comprises a Schottky diode and an emitter layer comprising a Compton and photoelectron source material. The emitter layer is configured to receive the gamma photons produced by the source material. The emitter layer is spaced apart from the Schottky diode a distance such that a gap is defined between the emitter layer and the Schottky diode. The distance is selected such that only electrons produced by the emitter layer as a result of the emitter layer absorbing the gamma photons will contribute to a measured output signal of the Schottky diode.

Clause 2—The neutron flux detector of Clause 1, wherein the gap comprises a fluid or a gas positioned intermediate the Schottky diode and the emitter layer.

Clause 3—The neutron flux detector of Clause 1-2, wherein the neutron flux detector is configured for use in a nuclear reactor that is in operation, and wherein the mea-sured output signal is directly proportional to an amount of neutron flux due to fission in the nuclear reactor during operation.

Clause 4—The neutron flux detector of Clause 1-3, wherein the neutron flux detector comprises a plurality of the solid state radiation detectors arranged in an array and positioned radially about the source material.

Clause 5—The neutron flux detector of Clause 1-4, wherein the source material comprises a Ni-61 source mate-rial.

Clause 6—The neutron flux detector of Clause 5, wherein the measured output signal is proportional to a Ni-62 pro-duction rate produced by neutron capture of the Ni-61 source material.

Clause 7—A neutron flux detector comprising a Ni-61 source material and a plurality of enhanced gamma sensi-tivity (EGS) radiation detectors is disclosed. The Ni-61 source material is configured to produce gamma photons during neutron capture. Each radiation detector comprises a Schottky diode and an emitter layer comprising a Compton and photoelectron source material. The emitter layer is configured to receive the gamma photons produced by the Ni-61 source material. The emitter layer is spaced apart from the Schottky diode a distance such that a gap is defined between the emitter layer and the Schottky diode. The distance is selected such that only electrons produced by the emitter layer as a result of the emitter layer absorbing the gamma photons will contribute to a measured output signal of the Schottky diode.

Clause 8—The neutron flux detector of Clause 7, wherein the gap comprises a fluid or a gas intermediate the Schottky diode and the emitter layer.

Clause 9—The neutron flux detector of Clause 7-8, wherein the neutron flux detector is configured for use in a nuclear reactor that is in operation, and wherein the measured output signal is directly proportional to an amount of neutron flux due to fission in the nuclear reactor during operation.

Clause 10—The neutron flux detector of Clause 7-9, wherein the plurality of EGS radiation detectors are arranged in an array and positioned radially about the Ni-61 source material.

Clause 11—The neutron flux detector of Clause 7-10, wherein the gamma photons produced by the Ni-61 source material during neutron capture are greater than or equal to 6.8 MeV.

Clause 12—The neutron flux detector of Clause 7-11, wherein the measured output signal is proportional to a Ni-62 production rate produced from neutron capture by the Ni-61 source material.

Clause 13—A neutron flux detector for use in a fast neutron nuclear reactor is disclosed. The neutron flux detector comprises a source material and an array of enhanced gamma sensitivity (EGS) radiation detectors positioned radially about the source material. The source material is configured to produce gamma photons of a predetermined magnitude during neutron capture when the fast neutron nuclear reactor is in operation. Each EGS radiation detector comprises a Schottky diode and an emitter layer comprising a Compton and photoelectron source material. The emitter layer is configured to receive the gamma photons produced by the source material. The emitter layer is spaced apart from the Schottky diode a distance such that a gap is defined between the emitter layer and the Schottky diode. The distance is selected such that only electrons produced by the emitter layer as a result of the emitter layer absorbing gamma photons of the predetermined magnitude will contribute to a measured output signal of the Schottky diode.

Clause 14—The neutron flux detector of Clause 13, wherein the gap comprises a fluid or a gas intermediate the Schottky diode and the emitter layer.

Clause 15—The neutron flux detector of Clause 13-14, wherein the measured output signal is directly proportional to an amount of neutron flux due to fission in the fast neutron nuclear reactor during operation.

Clause 16—The neutron flux detector of Clause 13-15, wherein the measured output signal is directly proportional to a current reactor power level in the fast neutron nuclear reactor during operation.

Clause 17—The neutron flux detector of Clause 13-16, wherein the distance between the emitter layer and the Schottky diode is adjustable.

Clause 18—The neutron flux detector of Clause 13-17, where the source material comprises a Ni-61 source material.

Clause 19—The neutron flux detector of Clause 13-18, wherein the predetermined magnitude is greater than or equal to 6.8 MeV.

Clause 20—The neutron flux detector of Clause 18-19, wherein the measured output signal is proportional to a Ni-62 production rate produced from neutron capture by the Ni-61 source material.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A neutron flux detector, comprising:
a source material configured to produce gamma photons greater than or equal to 6.8 MeV during neutron capture; and
a solid state radiation detector, comprising:
a Schottky diode; and
an emitter layer comprising a Compton and photoelectron source material, wherein the emitter layer is configured to receive the gamma photons produced by the source material, wherein the emitter layer is spaced apart from the Schottky diode a distance such that a gap is defined between the emitter layer and the Schottky diode, wherein the distance is selected such that only electrons produced by the emitter layer as a result of the emitter layer absorbing the gamma photons will contribute to a measured output signal of the Schottky diode.

2. The neutron flux detector of claim 1, wherein the gap comprises a fluid or a gas positioned intermediate the Schottky diode and the emitter layer.

3. The neutron flux detector of claim 1, wherein the neutron flux detector is configured for use in a nuclear reactor that is in operation, and wherein the measured output signal is directly proportional to an amount of neutron flux due to fission in the nuclear reactor during operation.

4. The neutron flux detector of claim 1, wherein the neutron flux detector comprises a plurality of the solid state radiation detectors arranged in an array and positioned radially about the source material.

5. The neutron flux detector of claim 1, wherein the source material comprises a Ni-61 source material.

6. The neutron flux detector of claim 5, wherein the measured output signal is proportional to a Ni-62 production rate produced by neutron capture of the Ni-61 source material.

7. A neutron flux detector, comprising:

a Ni-61 source material configured to produce gamma photons during neutron capture; and a plurality of enhanced gamma sensitivity (EGS) radiation detectors, wherein each radiation detector comprises:

a Schottky diode; and an emitter layer comprising a Compton and photoelectron source material, wherein the emitter layer is configured to receive the gamma photons produced by the Ni-61 source material, wherein the emitter layer is spaced apart from the Schottky diode a distance such that a gap is defined between the emitter layer and the Schottky diode, wherein the distance is selected such that only electrons produced by the emitter layer as a result of the emitter layer absorbing the gamma photons will contribute to a measured output signal of the Schottky diode.

8. The neutron flux detector of claim 7, wherein the gap comprises a fluid or a gas intermediate the Schottky diode and the emitter layer.

9. The neutron flux detector of claim 7, wherein the neutron flux detector is configured for use in a nuclear reactor that is in operation, and wherein the measured output signal is directly proportional to an amount of neutron flux due to fission in the nuclear reactor during operation.

10. The neutron flux detector of claim 7, wherein the plurality of EGS radiation detectors are arranged in an array and positioned radially about the Ni-61 source material.

11. The neutron flux detector of claim 7, wherein the gamma photons produced by the Ni-61 source material during neutron capture are greater than or equal to 6.8 MeV.

12. The neutron flux detector of claim 11, wherein the measured output signal is proportional to a Ni-62 production rate produced from neutron capture by the Ni-61 source material.

13. A neutron flux detector for use in a fast neutron nuclear reactor, comprising:

a source material configured to produce gamma photons of a predetermined magnitude during neutron capture when the fast neutron nuclear reactor is in operation; and an array of enhanced gamma sensitivity (EGS) radiation detectors positioned radially about the source material, wherein each EGS radiation detector comprises:

a Schottky diode; and an emitter layer comprising a Compton and photoelectron source material, wherein the emitter layer is configured to receive the gamma photons produced by the source material, wherein the emitter layer is spaced apart from the Schottky diode a distance such that a gap is defined between the emitter layer and the Schottky diode, wherein the distance is selected such that only electrons produced by the emitter layer as a result of the emitter layer absorbing gamma photons of the predetermined magnitude will contribute to a measured output signal of the Schottky diode.

14. The neutron flux detector of claim 13, wherein the gap comprises a fluid or a gas intermediate the Schottky diode and the emitter layer.

15. The neutron flux detector of claim 13, wherein the measured output signal is directly proportional to an amount of neutron flux due to fission in the fast neutron nuclear reactor during operation.

16. The neutron flux detector of claim 13, wherein the measured output signal is directly proportional to a current reactor power level in the fast neutron nuclear reactor during operation.

17. The neutron flux detector of claim 13, wherein the distance between the emitter layer and the Schottky diode is adjustable.

18. The neutron flux detector of claim 13, where the source material comprises a Ni-61 source material.

19. The neutron flux detector of claim 18, wherein the predetermined magnitude is greater than or equal to 6.8 MeV.

20. The neutron flux detector of claim 19, wherein the measured output signal is proportional to a Ni-62 production rate produced from neutron capture by the Ni-61 source material.

* * * * *